Oct. 12, 1948.  E. DAWSON ET AL  2,450,884

PRESSURE MEASURING APPARATUS

Filed July 27, 1944  3 Sheets-Sheet 1

INVENTORS
EDWARD DAWSON
JOHN R. ERICSON
BY Paul B. Hunter
ATTORNEY

Oct. 12, 1948.
E. DAWSON ET AL
2,450,884
PRESSURE MEASURING APPARATUS
Filed July 27, 1944      3 Sheets-Sheet 3

INVENTORS
EDWARD DAWSON
JOHN R. ERICSON
BY
Paul B. Hunter
ATTORNEY

Patented Oct. 12, 1948

2,450,884

UNITED STATES PATENT OFFICE 2,450,884

PRESSURE MEASURING APPARATUS

Edward Dawson, New York, and John Rowland Ericson, Westbury, N. Y., assignors to The Sperry Corporation, a corporation of Delaware Application July 27, 1944, Serial No. 546,868

18 Claims. (Cl. 73—205)

This invention relates generally to apparatus for measuring a variable condition and particularly concerns measurement of a variable pressure as well as the rate of change thereof.

It is sometimes desirable to provide relatively high torque measures of variable conditions as, for example, to control mechanisms according to variations in the measured condition or to supply data corresponding to the measured condition into a computer mechanism. Some applications require that the measurement be substantially continuous without appreciable lag, regardless of the load on the measuring instrument. This latter requirement is particularly evident when, for example, the rate of change of the measured condition is to be obtained from the output of the measuring instrument.

It is an important object of this invention to provide improved measuring apparatus producing a substantial torque output measure of a variable condition.

Another object of the invention is to provide improved measuring apparatus in which the output is steady and accurate, irrespective of variation in loads on the instrument.

A further object of the invention is to provide improved measuring apparatus for obtaining the measure of the rate of change of a variable condition.

Another important object of the invention is to provide improved pressure measuring apparatus having a substantial torque output measure of a variable pressure.

A further object of the invention is to provide improved pressure measuring apparatus in which the output is a steady and accurate measure of the pressure, irrespective of changes in load on the apparatus.

A further object of the invention is to provide improved measuring apparatus for providing an accurate measure of the rate of change of a variable pressure.

A further object of the invention is to provide improved pressure measuring apparatus for obtaining a measure of dynamic pressure having substantial torque output.

A further object of the invention is to provide improved follow-up mechanisms for measuring apparatus whereby hunting is reduced and smoother as well as more accurate measures are obtained.

A still further object of the invention is to provide an improved pressure unit of simple construction which may be economically manufactured and easily assembled.

Other objects and advantages will become apparent from the following description taken in connection with the accompanying drawings, wherein.

According to the invention, a sensitive device responsive to the condition being measured applies a force to a lever concomitant with the magnitude of the measured condition. A spring applies an opposing force to the lever so it moves about a fulcrum in one direction or the other to operate contact members that are arranged to control a follow-up circuit for adjusting the tension of the spring until the forces applied to the lever are in equilibrium.

A particular follow-up arrangement found to operate satisfactorily includes a constant speed motor and an intermittently operable motor driving two inputs of a differential. The speed of the intermittently operable motor is controlled by a contact on the lever to increase or decrease, dependent upon whether the force applied to the lever by the spring is greater or less than the force applied by the sensitive device. The output of the differential which is driven according to the difference between the speeds of the two motors adjusts the tension on the spring in a manner to restore an equilibrium condition between the two forces applied to the lever.

To provide cyclic operation of the follow-up mechanism, a disturbing force is periodically applied to the lever to cause oscillations thereof.

These oscillations make and break the contact periodically, so the speed of the intermittently operable motor is controlled according to the time during which the contact is closed. A change in either of the forces applied to the lever changes the normal position of the lever and thereby changes the time interval during which the contact is closed, so the speed of the intermittently operable motor varies to adjust the spring toward an equilibrium condition.

To measure static pressure, an evacuated bellows is connected to one end of the lever arm and is included together with the spring and the lever in an air-tight casing which may be connected as by an appropriate conduit to the static pressure being measured. In measuring dynamic pressure, the interior of the bellows is connected to the static pressure and the casing to the total pressure, so the force applied by the bellows to the lever depends upon the difference between the total pressure and the static pressure which difference corresponds to the dynamic pressure. Hence, the force applied by the spring to equalize that applied by the bellows is a measure of the dynamic pressure.

The rate of change of pressure is obtained by connecting the output of the differential in the follow-up system to a suitable differentiating mechanism which may include apparatus for operating a variable speed device, so its output has a rate corresponding to the output of the differential. When this occurs, the position of the rate control of the variable speed device provides a measure of the rate of change of the pressure condition.

When it is desired to obtain the rate of change of pressure as well as of the pressure itself, a modified form of the invention may be used where the follow-up system includes a variable speed device having its rate controlled according to the differential between the rates of the constant speed motor and the intermittently operable motor; the output of the variable speed device adjusting the tension of the spring. With this arrangement, the adjustable member of the variable speed device provides a measure of the rate of change of the variable pressure, whereas the output of the variable speed device, which corresponds to the tension of the spring, provides a measure of the pressure condition itself.

Figures 1, 1A:
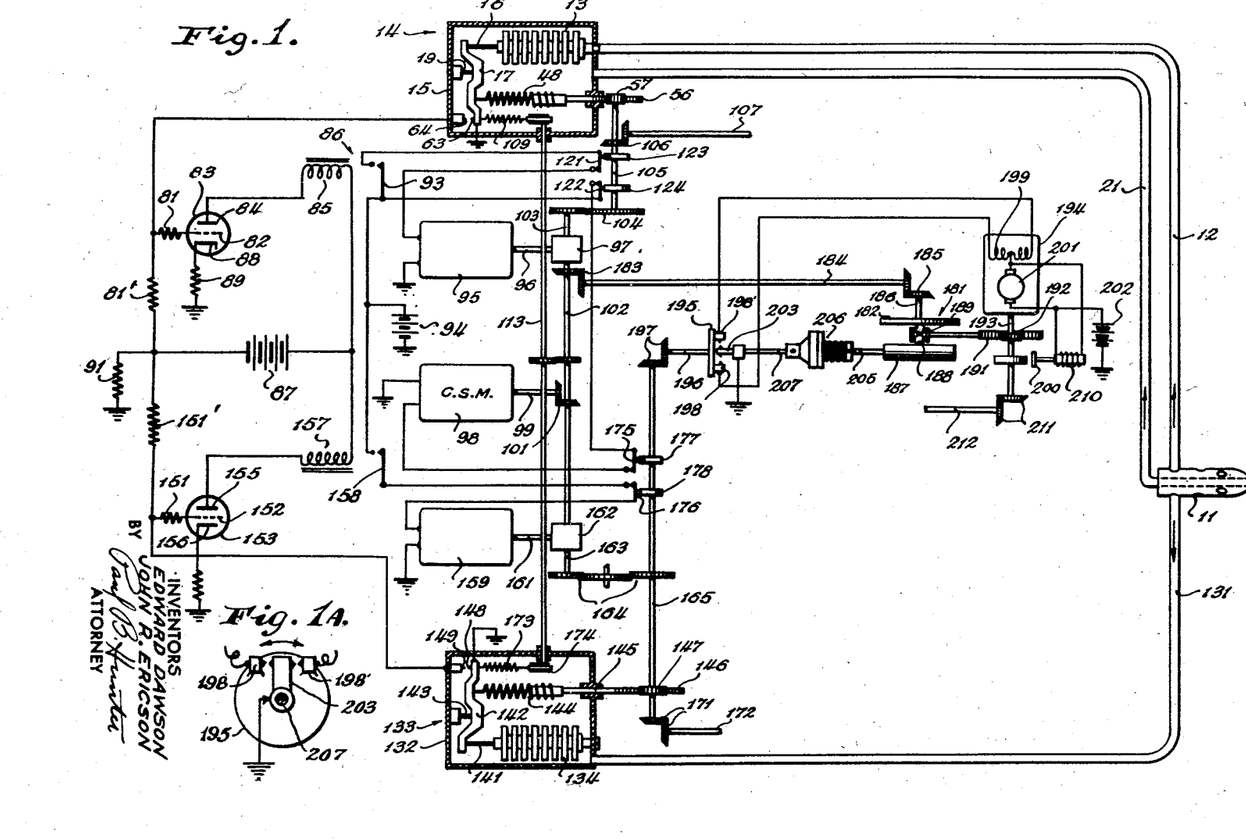
Fig. 1 is a schematic diagram of mechanisms and circuits arranged for measuring static pressure, rate of change of static pressure and dynamic pressure in accordance with the invention.
Fig. 1A is a detail of contact disc 195 and associated apparatus.

Referring now to Fig. 1, there is shown apparatus embodying the invention which provides relatively high torque output measures of dynamic pressure, static pressure and the rate of change of static pressure. In this figure, static pressure from a conventional Pitot tube 11 is supplied as by conduit 12 to the interior of a bellows 13 of a dynamic pressure unit 14. The bellows 13 is secured to frame 15 of the pressure unit 14 and is connected as by a flexible spring 16 to one arm of a lever 17. The lever 17 is attached to the frame 15 of the pressure unit by a flexible member 19, preferably of spring steel, forming a fulcrum for the lever. The frame 15 has an air-tight casing and is supplied with total pressure from the Pitot tube 11 as by conduit 21 so the total pressure acts on the exterior portion of the bellows 13.

Figure 2:
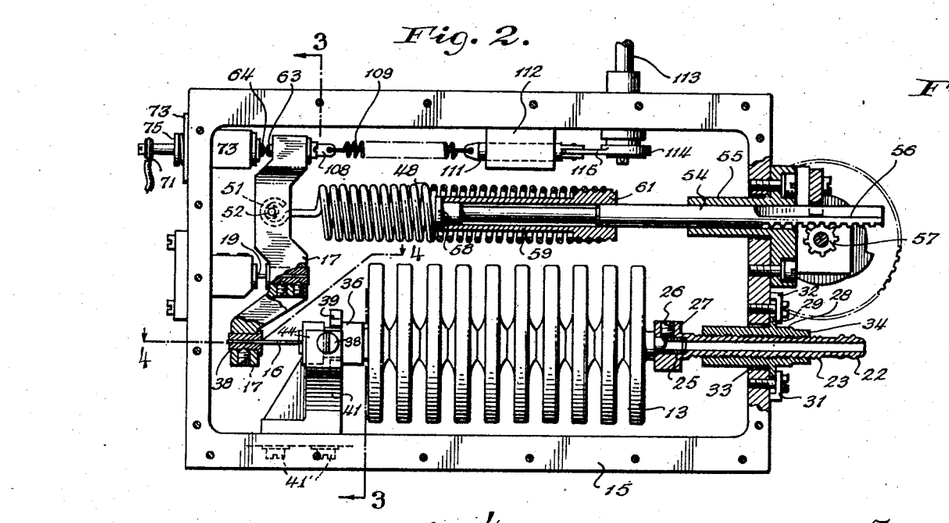
Fig. 2 is an elevation view of the dynamic pressure unit shown in Fig. 1, with the cover removed and some parts in sections and others broken away for purposes of clearness.

The arrangement of the pressure unit may be seen more clearly in Fig. 2, wherein the static pressure input from the conduit 12 is shown as a nipple 22 that has a threaded stem portion 23 secured to neck 25 from the bellows 13 as by setscrew 26 in collar 27 to form a support for the bellows. The stem 23 is threadedly carried in the frame 15 of the pressure unit by a sleeve 28 having a shoulder 29 held by brackets 31 and 32 against the exterior of the frame to hold the sleeve positioned in a hole 33 formed in the frame. With this arrangement, rotation of the sleeve 28 as by turning nut portion 34 thereon moves the stem 23 together with the bellows 13 inwardly or outwardly with respect to the frame. The opposite end of the bellows is attached through a connector or adapter 36 to a flexible spring 16 that is secured by split fastener 38 to one end of the lever 17. The connector 36 is restrained from lateral movement by a spring 42 (Figs. 3 and 4) which is secured by similar split fasteners 38 in the connector 36 and in arm 44 on the bracket 41. The arm 39 on bracket 41 serves as a stop for connector 36 to prevent excessive travel of the bellows 13 which could deform contacts on the lever 17. Bracket 41 is secured to casing 15 by machine screws 41' as indicated in Figs. 2 and 3.

With this arrangement supporting the bellows 13, spring 42 permits longitudinal movement of the bellows but prevents lateral movement thereof, whereas spring 16 provides a rigid connection that is substantially free from play but sufficiently flexible to permit relative movement between the bellows and the lever during movements of the lever on its fulcrum 19. These flexible spring supports and connectors reduce friction, thereby avoiding static frictional loads on the apparatus.

Figure 3:
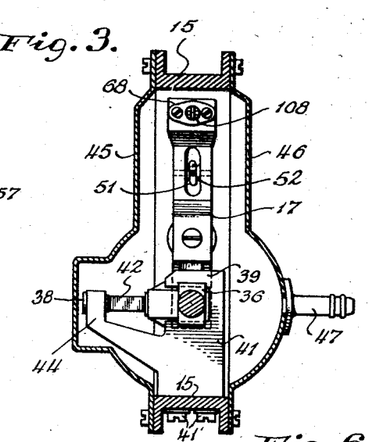
Fig. 3 is a vertical section taken on the line 3—3 of Fig. 2.
Figure 4:
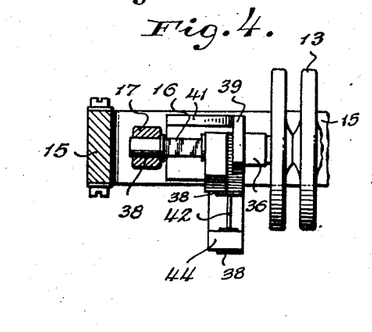
Fig. 4 is a partial horizontal section taken on the line 4—4 of Fig. 2.

As shown in Fig. 3, the frame 15 has its sides enclosed by cover plates 45 and 46 to form a substantially air-tight container that is connected as by nipple 47 to total pressure conduit 21. Since the interior of the bellows is supplied with static pressure from the conduit 12 and the exterior thereof with total pressure from conduit 21, the net force exerted by the bellows through flexible spring 16 on the lever 17 corresponds to the dynamic pressure at the Pitot tube 11. A coiled tension spring 48 is connected to the arm of the lever 17 as by hook 51 on rod 52 to apply a force to the lever, counterbalancing that applied by the bellows 13. When these forces are equal, the tension of the spring 48 is a measure of the dynamic pressure.

To adjust the tension of the spring 48, a rod 54 is slidable in a stuffing box 55 carried by the frame 15. The rod 54 has one end, extending externally of the frame 15, formed with a rack 56 adapted to engage a pinion 57 which is rotated automatically in a manner subsequently to be described. The interior end of the rod 54 is formed with a head 58 to retain a steel sleeve 59 on the rod 54. The sleeve 59 has an enlarged threaded end portion 61 arranged to engage coils at the end of the spring 48 thereby connecting the spring 48 through the sleeve 59 to the rod 54, so the tension of the spring 48 is controlled by the position of the rack 56 as determined by pinion 57. Since the displacement of the rod 54 and the rack 56 determines the tension of the spring 48, this displacement, when forces applied to the lever 17 are in equilibrium, provides a measure of the dynamic pressure.

In order that this measure of the dynamic pressure may be as accurate as possible, it is necessary that the forces applied to the lever 17 should be unaffected by variations in other conditions than the pressure applied to the bellows 13 or the tension of the spring 48. To compensate for expansion of the beryllium copper bellows 13 due to temperature changes, the rod 54 is preferably selected of material having nearly the same coefficient of expansion. The length from the average point of contact between rack 56 and pinion 57 to the head 58 is selected so that changes in temperature vary the length of the rod an amount sufficient to apply a force to the lever 17 corresponding to that applied by changes in dimensions of the bellows 13 for the same temperature variation. Since sleeve 59 is made of steel, it is less affected by temperature changes and permits a greater overall length of the rod 54 within the small space available.

The spring constant of the spring 48 determines the calibration factor of the apparatus. In order to obtain the desired calibration factor, the effective length of the spring may be adjusted to the correct value by relatively turning the sleeve 59 in the spring 48. To adjust the mechanism for zero reference, the force applied by the bellows for a given pressure may be varied by turning the nut 34 to move the bellows relative to the frame as previously explained.

Figure 5:
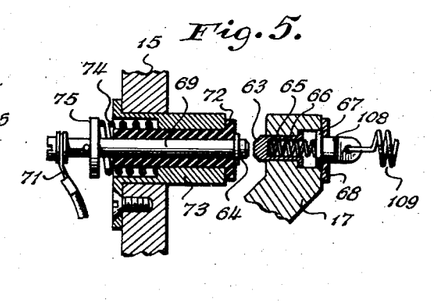
Fig. 5 is an enlarged sectional view of the contact members shown in Fig. 2.

When the force applied by the bellows is more than that applied by the spring, contact members 63 and 64 engage to control the motor as will be subsequently explained. In order that contacts 63 and 64 may remain closed during small movements of the lever 17 and the full pressure from the bellows 13 will not be applied to the contacts, one of the contacts 63 is spring-loaded as shown in Fig. 5. For this purpose, the contact 63 is slideable in a hole 65 drilled in the lever 17 and is forced outwarly by a compression spring 66 engaging a button 67 maintained in position by washer 68. It is essential that the contact 64 be insulated from the casing 15 and it is desirable that changes in temperature do not affect the spacing between the contacts 63 and 64.

For this purpose, the contact 64 is supported on the end of a conducting rod 69 extending through the casing 15 and having a suitable terminal connection 71. The rod 69 carries a fiber washer 72 engaging ends of a steel bushing 73 inserted in the casing 15. The contact 64 is held against the washer 72 by a compression spring 74 seated in a recess in the bushing 73 and engaging an insulating fiber washer 75 on the opposite end of the rod. With this arrangement, changes in the length of the bushing 73 and the rod, due to changes in temperature, cause the rod to move in the bushing 72 and thus maintains substantially constant the spacing between contacts 63 and 64.

Contact 63 is grounded through the lever 17 in the casing, whereas contact 64 is connected through resistor 81 to grid 82 of an electron discharge tube 83 having its plate 84 connected through a coil 85 of relay 86 to a suitable source of positive potential, such as battery 87, the negative side of the battery being grounded. Cathode 88 of the tube 83 is connected to a cathode resistor 89 to ground and a negative bias is normally applied to the grid 82 by the drop across resistor 91 that is connected through resistors 81 and 81'. When the contacts 63 and 64 are closed, the negative bias is removed from grid 82 by grounding resistor 81. The tube 83 then conducts current to operate relay 86 in a manner to close relay switch 93 which closes a power circuit from battery 94 through intermittently operable motor 95. The speed of the motor for a reason which will appear as the description proceeds is controlled by the time during which the relay switch 93 is closed which, in turn, depends upon the time during which contacts 63 and 64 are closed.

The motor 95 drives through shaft 96 forming one input of a subtracting differential 97, the other input of which is driven from constant speed motor 98 through shaft 99, gearing 101 and shaft 102. The output of the differential which is formed by shaft 103 operates through gearing 104 to turn shaft 105 which controls pinion 57 to move rack 56 for changing the tension of the spring 48. With this arrangement, tension of the spring 48 is adjusted according to the difference between the speeds of the motors 95 and 98 and the angular position of shaft 105 is transmitted through gearing 106 to shaft 107 whose angular position, in turn, represents a measure of the dynamic pressure.

In order to provide stable operation of the follow-up apparatus including motors 95 and 98 which are controlled by the contacts 63 and 64 to quickly and smoothly position the shaft 105 for maintaining an equilibrium condition between the forces of spring 48 and bellows 13, a harmonic disturbing force is applied to the lever 17, thereby causing oscillation of the lever and periodically opening and closing contacts 63 and 64. This periodic disturbing force is shown as being applied by a spring 109 that is connected to the lever 17 by a stub 108 (Fig. 5), which is secured to the lever 17 by the washer 68. The other end of the spring 109 is connected to a rod 111 mounted for reciprocation in a sleeve formed in support 112. The rod 111 is reciprocated by turning shaft 113 from constant speed motor 98 (Fig. 1). The shaft 113 rotates an eccentric 114 which, in turn, reciprocates link 115 connected to the rod 111 for continuously applying harmonic motion for changing the tension of the spring 109, thereby periodically applying a harmonic disturbing force to the lever 17.

This harmonic disturbing force causes oscillation of the lever 17 so the contacts 63 and 64 are continuously opened and closed, the period during which they are closed being determined by the relative forces applied to the lever 17 by the bellows 13 and the spring 48. As already described, the time interval during which the contacts are closed determines the speed of the motor 95. When the force from the bellows 13 is greater than that from the spring 48 on the lever 17, the contacts are closed for a greater period of time causing the motor 95 to exceed the speed of the constant speed motor 98, so the output of the differential 97 turns the shaft 105 to move rack 56 outwardly with respect to the casing of the pressure unit, thereby increasing the tension of the spring 48 until an equilibrium is reached.

At this time, the time interval during which the contacts are closed will be just sufficient to cause motor 95 to rotate at the same speed as the constant speed motor 98. Shafts 105 and 107 rapidly and accurately provide a measure of the dynamic pressure with a substantial torque output from the shaft 107. The dither apparatus improves the pressure measuring operation, in that it reduces hunting of the follow-up system so the angular position of the shaft 107 remains substantially constant for a constant pressure condition.

In order to prevent excessive movement of the rack 56, limit switches 121 and 122 are placed in the circuits of the intermittently operable motor 95 and constant speed motor 98, respectively. These switches are operated by cams 123 and 124 arranged to open one switch or the other when a desired amount of displacement of the rack in one direction or the other is reached. When the circuit of one of these motors is open, the output of the differential 97 is equal to the output of the motor that is running, so the rack 56 is moved in the opposite direction until it closes the open limit switch.

Figure 6:
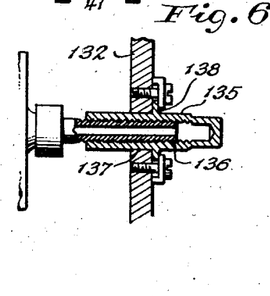
Fig. 6 is a sectional view of a modified support and connection for the pressure responsive bellows shown in Fig. 1 which is adapted to measure static pressure.

The apparatus for measuring static pressure is substantially the same as that described in connection with the dynamic pressure unit. Static pressure from the Pitot tube 11 is supplied by way of conduit 131 to the interior of air-tight casing 132 of static pressure unit 133. Bellows 134 supported within casing 132 is evacuated and has its interior sealed off, as shown in Fig. 6, by a cap 135 on threaded stem 136 carried by the bellows 134. The cap 135 also serves as a support for the bellows 134, since it is fitted in a hole 137 formed in the casing 132 and is held in position by a shoulder 138 on the cap 135.

The static pressure unit 133 is otherwise substantially the same as the dynamic pressure unit 14 previously described. The bellows 134 is connected by a flexible spring 141 to lever 142 secured to the casing 132 by a flexible spring 143 forming a fulcrum for the lever. To counterbalance the force of the bellows 134, a spring 144 has one end attached to the lever 142 and the other end to a rod 145 slideable in the casing 132 and carrying a rack 146 externally of the casing to mesh with a pinion 147.

A contact 148 carried by the lever 142 is adapted to engage a cooperating contact 149 supported on the casing and connected through resistor 151 to control grid 152 of an electron discharge tube 153. Normally, a negative bias is applied to the grid 152 by the drop across resistor 91 connected to grid 152 through resistors 151 and 151'. When the contacts 148 and 149 are closed, the negative bias is removed from the grid 152 by grounding resistor 151. This causes current to flow between plate 155 and cathode 156, thereby drawing current through a relay coil 157 in the circuit of plate 155 operating relay switch 158, closing the circuit of intermittently operable motor 159.

Intermittently operable motor 159 drives through shaft 161 to differential 162 having its other input driven by shaft 102 from the constant speed motor 98, so the output shaft 163 of the differential 162 is driven according to the difference between the speeds of the constant speed motor 98 and the variable speed motor 159. This output shaft 163 is connected to gearing 164 to shaft 165 that carries the pinion 147 to position rack 146 for adjusting the tension of spring 144 and thereby varying the force applied to the lever 142. Dependent upon the relative magnitudes of the forces applied to lever 142 by the bellows 134 and the spring 144, contacts 148 and 149 will be opened or closed to vary the speed of the motor 159. When the speed of the motor 159 equals that of the constant speed motor 98, position of shaft 165 is such that the spring 144 is applied with force to lever 142 corresponding to that applied by the bellows 134. Hence, the angular position of shaft 165 is a measure of the static pressure supplied from conduit 131 to the casing 132. This measure of static pressure is transmitted through gear 171 to static pressure output shaft 172 where it may be utilized in any desired manner.

In order to stabilize operation of the follow-up system and to provide a smoother and more accurate measure of static pressure, a disturbing force is periodically applied to the lever 142 as by spring 173 connected to the lever 142 and having its tension constantly changed by an eccentric 174 driven from constant speed motor 98 by the shaft 113. The spring 173, therefore, periodically applies a harmonic disturbing force to the lever 142 to periodically open and close the contacts 148 and 149. The contact 148 may be spring-loaded in the same manner as the contact 63 in the dynamic pressure unit. With this arrangement, the time interval during which the contacts 148 and 149 are closed during each period of the operation of spring 173 depends upon the relative magnitudes of the forces exerted on the lever 142 by the bellows 134 and the spring 144. Since the time interval during which the contacts 148 and 149 are closed controls the speed of intermittently operable motor 159, when the two forces applied to the lever 142 are in equilibrium, the time interval during which the contacts are closed will be sufficient to operate the motor 159 at the same speed as that of the constant speed motor 98. In this condition, the output shaft 163 of the differential 162 is stationary and its angular position which corresponds to the angular position of the shaft 165 is a measure of the static pressure supplied to the casing 132.

In order to avoid excessive movement of the rack 146, suitable limit switches 175 and 176 are inserted in the circuits of constant speed motor 98 and intermittently operable motor 159, respectively. These switches are operated by cams 177 and 178 arranged on the shaft 165 to open the switches when the rack 146 reaches its terminal position. Opening of one of the limit switches 175 or 176 stops operation of either the constant speed motor 98 or the intermittently operable motor 159, so the output of the differential 163 causes the shaft 165 to move the rack 146 in the opposite direction to move it away from its limiting position until the limit switch is closed.

It is frequently desirable to provide a measure of the rate of change for a variable condition as well as a measure of the variable condition itself. For example, as illustrated in Fig. 1, it may be desirable to obtain a measure of rate of change of the static pressure as measured by the static pressure apparatus just described. To accomplish this, a differentiating mechanism is shown as including a variable speed drive 181 having a disc 182 driven from constant speed motor 98 through shaft 102, gearing 183, shaft 184, gearing 185 and shaft 186. Motion from the disc 182 is transmitted to a driven drum 187 by a pair of balls 188 supported in a carriage 189 displaceable radially of the disc 182 by translation of rack 191. The position of the rack 191 is controlled by a pinion 192 carried on a shaft 193 that is driven from reversible motor 194 in a manner to be described. Since the angular position of the shaft 165 is an accurate measure of the static pressure, the shaft 165 is used to position contact disc 195 carried on shaft 196 that is driven by gearing 197 from the shaft 165. The disc 195 carries a pair of contacts 198 and 198' that are connected to opposite sides of a two-part field winding 199 in the motor 194. The center point of the field winding 199 is connected through armature 201 to a source of potential such as battery 202 having its opposite terminal connected to ground.

A grounded contact radial arm 203, as shown in Fig. 1A, is mounted on shaft 207, which is actuated by drag spindle or slip clutch 206 driven by shaft 205 forming the output from the driven drum 187 of the variable speed drive 181, so that the position of the contact 203 tends to correspond to the output speed of the variable speed drive 181. Since the contacts 198 and 198' are rotatably varied in position corresponding to the rate of change of the static pressure being measured, any difference between the angular position of these contacts and that of contact 203 will cause either the contact 198 or the contact 198' to engage contact 203, thereby completing the circuit from battery 202 through armature 201 and one-half of field winding 199 to ground. Dependent upon which side of the field winding 199 is connected in the circuit, the armature 201 will drive shaft 193 in one direction or the other to change the position of the ball carriage in a manner to adjust the speed of output shaft 207 to match the speed of the shaft 196 driving contacts 198 and 198'.

In order to prevent overrunning of the shaft 193, a brake 200 is operated by solenoid 210 to permit free rotation of the shaft when contact 198 or 198' is closed, but to stop rotation of the shaft 193 immediately when the contact opens. This causes the shaft 193 to hold its position except during periods of energization of the motor.

Figure 7:
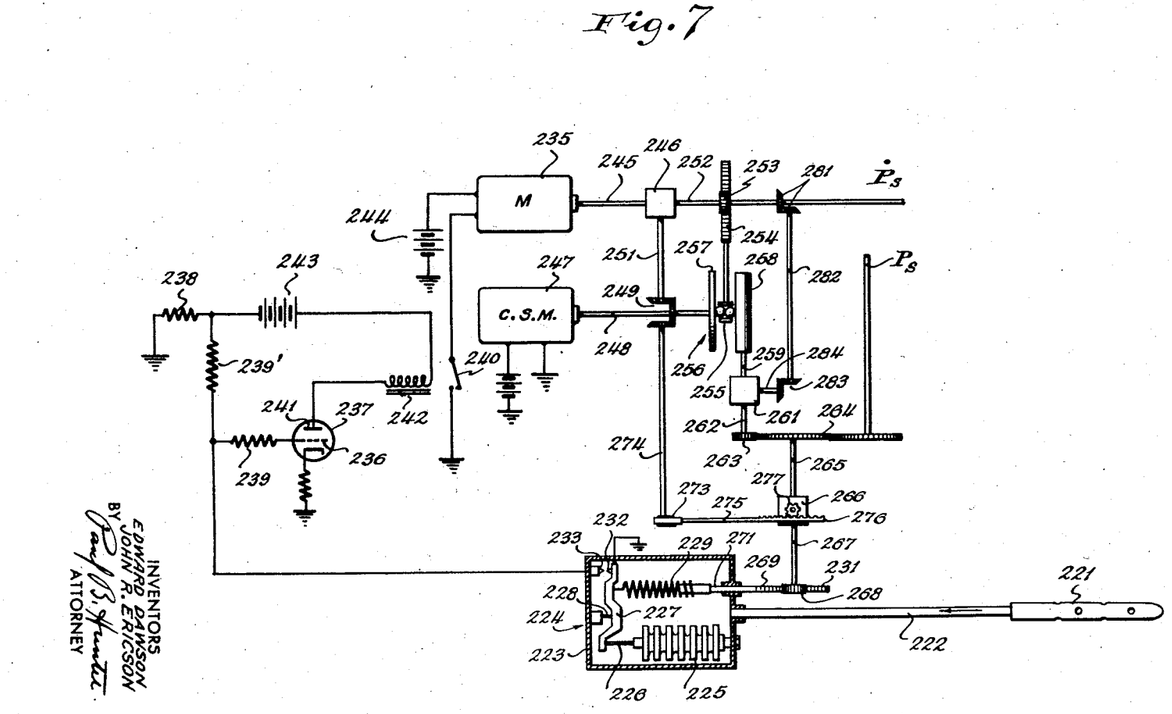
Fig. 7 is a schematic diagram of mechanisms and circuits embodying the invention in a modified form for obtaining measures of static pressure and the rate of change thereof.

When the equilibrium condition is reached where the speed of contact 203 equals that of contact disc 195, displacement of ball carriage 189 will be an accurate measure of the speed, since it controls the speed of the drum 187. Since contact disc 195 is driven at a speed determined by the change of the static pressure being measured, the position of the ball carriage 189 as determined by pinion 192 from motor 194 will be a measure of the rate at which the static pressure is changing. This measure of static pressure rate may be supplied from shaft 193 through gearing 211 to static pressure rate output shaft 212 for use in any manner that may be desired.

Where it is desirable to obtain both measures of static pressure and the rate of change thereof, a simplified arrangement, such as that shown in Fig. 7, may be used. In this figure, static pressure from Pitot tube 221 is supplied through conduit 222 to the interior of casing 223 of static pressure unit 224 containing an evacuated bellows 225 connected as by spring 226 to lever 227. The lever 227 is supported by a flexible fulcrum 228 on the casing 223 and has a spring 229 exerting the opposing force on the lever 227 as determined by the position of rack 231. Dependent upon the relative magnitudes of the forces applied to the lever 227 by the bellows 225 and the spring 229, contacts 232 and 233 are opened or closed to cause operation of intermittently operable motor 235. When these contacts are closed, the negative bias applied to grid 236 of electron discharge tube 237 by resistor 238 through resistors 239 and 239' is removed by grounding resistor 239. The tube 237 has its plate 241 connected through relay coil 242 to battery 243 so current in the circuit of plate 241 causes operation of relay switch 240 which closes the circuit of motor 235 through battery 244.

The output of the intermittently operable motor, as represented by shaft 245, drives into one input of a differential 246 having its other input driven from constant speed motor 247 through shaft 248, gearing 249 and shaft 251. The output of the differential 246, as represented by shaft 252, is thereby rotated according to the difference between the speeds of the motors 235 and 247. This shaft 252 operates through pinion 253 and rack 254 to control the position of ball carriage 255 of variable speed drive 256 having its disc 257 driven by shaft 248 from the constant speed motor 247. With this arrangement, the speed of output drum 258 is controlled according to the angular displacement of shaft 252 and drives through shaft 259 to a differential 261 and operates output shaft 262 of the differential 261. This output of the differential 261 drives pinion 263 and gear 264 to position shaft 265, which operates through differential 266 to position shaft 267 and pinion 268 cooperating with rack 269 for translating rod 271 to vary the tension applied by spring 229 to the lever 227.

From an examination of the apparatus shown in Fig. 7, it will be apparent that the motor 235 is operated by contacts 232 and 233 according to the difference in magnitude of the forces applied by bellows 225 and spring 229 to the lever 227. The speeds of the motor 235 and constant speed motor 247 are subtracted in differential 246 and operate the variable speed drive 256 to change the tension of spring 229, thereby changing the force it applies to lever 227. When the forces applied to lever 227 are in equilibrium, the position of the rack 231 will be a measure of static pressure within the casing 223. Since the position of this rack is controlled by the output of the variable speed drive 256, the position of ball carriage 255 as determined by pinion 253 on shaft 252 will be a measure of the rate of change of the static pressure. Therefore, the shaft 252 provides a substantial torque output that is an accurate measure of the rate of change of the static pressure from the Pitot tube 221 and may be used in any desired manner.

In this embodiment of the invention, it is also desirable to apply a periodic disturbing force to the lever 227. In this case, the disturbing force is shown as applied through the spring 229. This is accomplished by an eccentric 273 on shaft 274 driven by constant speed motor 247 through gearing 249. The eccentric 273 reciprocates the rod 275 carrying rack 276 engaging with pinion 277 forming a second input to the differential 266. Since the eccentric 273 is rotated at a constant rate, the rod 275 continuously reciprocates, thereby oscillating the pinion 277 and adding this oscillation to the turning of the shaft 265 by differential 266 so output shaft 267 is positioned according to the sum of the output of the variable speed drive 256 and the oscillation of the pinion 277. Thus, the rack 231 controlling the tension applied to spring 229 is continuously oscillated, thereby periodically applying a harmonic disturbing force to the lever 227. The application of this periodic disturbing force greatly improves the operation of the follow-up apparatus and causes contacts 232 and 233 to periodically open and close, the time interval during which they are closed controlling the speed of the motor 235.

In order to stabilize the operation of the system, a displacement factor from the output of differential 246, as represented by shaft 252 corresponding to the rate of change of static pressure, is supplied from gearing 281 through shaft 282, gearing 283 and shaft 284 to differential 261. Since the shaft 259 from the drum 258 forming one input of the differential 261 is rotated at a speed corresponding to the rate of change of the pressure condition being measured and the shaft 284 is displaced according to the same speed, output shaft 262 of the differential 261 is controlled by two factors, namely, the displacement and rate of change of displacement of the shaft 252. With this arrangement, changes in the rate at which the pressure condition is varied provide impulses through the stabilizing connection of shaft 282 to differential 261 for rapidly positioning the shaft 267 in a direction to compensate the tension of spring 229 according to the changes in the pressure without waiting for the variable speed mechanism to pick up these changes and change the speed of its output accordingly.

In both embodiments of the invention, a sensitive device in the form of bellows responds to changes in the pressure condition being measured and thereby changes the force applied to a lever which acts as a control member connected between the bellows and a device in the form of a spring applying an opposing force to the lever. The lever or control member operates contacts for controlling the speed of a motor which is subtracted from the speed of the constant speed motor. This arrangement of controlling the speed of the motor and matching it with the speed of the constant speed motor has been found superior in the present application to operation of a single reversing motor for the reason that it eliminates the heating caused by high starting currents which continuously appear in operating a reversible motor first in one direction and then in the other. Smoother operation is also provided because the intermittently operable motor is operating on a flatter portion of its motor characteristic curve so changes in the applied voltage effect similar changes in speed, whereas in the starting and reversing motor changes in the applied voltage cause much larger accelerations. Another feature incident to the use of an intermittently operable motor and a constant speed motor is the requirement of only one control contact to cause operation of the output in the system in either direction, eliminating error due to gap width in a two-contact system necessary for a reversing motor.

The smoothness of operation of the pressure system is greatly improved by the periodic application of a small disturbing force to cause oscillation of the control contacts. Since the impulses are close together, the speed of the motor is instantaneously and smoothly controlled so the difference between the speeds of the intermittently operable and constant speed motors is comparatively smooth and provides an even output measure of the pressure condition or the rate of change thereof as the case may be.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Measuring apparatus comprising a control member, a sensitive device adapted to exert a force on said control member according to the condition being measured, an adjustable force-applying device connected to said control member for applying a balancing opposing force thereto, means for periodically applying a disturbing force to said control member, an electric motor, control circuits therefor intermittently operated by said control member according to the difference between the forces applied thereto, and a variable speed device having its speed controlled by said motor for adjusting said force-applying device.

2. Measuring apparatus comprising a sensitive device adapted to exert a force according to the condition being measured, a force-applying device connected to said sensitive device for applying an opposing force thereto, electric circuit means, jointly controlled by said devices, an electric motor intermittently operated by the electric circuit means according to the difference between said forces, a variable speed device operated by said motor for adjusting said force-applying device, and a stabilizing connection for further controlling said force-applying device by the output of said motor.

3. Measuring apparatus comprising a control member, a sensitive device adapted to exert a force on said control member according to the condition being measured, a force-applying device connected to said control member for applying an opposing force thereto, means for periodically applying a disturbing force to said control member, a constant speed motor, an intermittently operable motor means actuated by said control member according to the difference between said forces for controlling the speed of the intermittently operable motor, a variable speed device for adjusting said force-applying device, and differential means driven by said motors for controlling the speed of said variable speed device according to the difference between the speeds of said motors.

4. Measuring apparatus comprising a lever, a bellows connected to said lever and adapted to exert a force thereon according to the condition being measured, a force-applying device connected to said lever for applying an opposing force to said bellows and means for controlling said force applying device including a constant speed motor, an intermittently operable motor, means for controlling the speed of said intermittently operable motor by said lever according to the difference between said forces, and differential means driven by said motors for adjusting said force-applying device according to the difference between the speeds of said motors to equate said opposing force to said exerted force.

5. Measuring apparatus comprising a control member, a sensitive device adapted to exert a force on said control member according to the condition being measured, a force-applying device connected to said control member for applying an opposing force thereto, means for periodically applying a disturbing force to said control member, a constant speed motor, an intermittently operable motor, means for controlling the speed of the intermittently operable motor responsive to the differences between the forces applied to the control member, and differential means operated by said motors for adjusting said force-applying device according to the difference between the speeds of said motors.

6. Measuring apparatus comprising a sensitive device adapted to exert a force according to the condition being measured, a force-applying device directly connected to said sensitive device for applying an opposing force thereto, means for controlling the force-applying device including a constant speed motor, an intermittently operable motor, means controlling the speed of said intermittently operable motor according to the difference between said forces, a variable speed mechanism for adjusting said force-applying device, and differential means driven by said motors for controlling the speed of said variable speed mechanism according to the difference between the speeds of said motors.

7. Measuring apparatus comprising a lever, a bellows connected directly to the lever and adapted to exert a force thereon according to the condition being measured, a spring connected to the lever for applying an opposing force to the bellows, means for adjusting the force applied by the spring including an intermittently operable motor, means for controlling the speed of the motor by the lever according to the difference between said forces, a constant speed motor, and differential means driven by said motors for adjusting the spring according to the difference between the speeds of the motors to equate the opposing force of the spring to the exerted force.

8. Measuring apparatus comprising a lever, a bellows connected directly to the lever and adapted to exert a force thereon according to the condition being measured, a spring connected to the lever for applying an opposing force to the bellows, means for adjusting the force applied by the spring to the lever including electric circuit means operable by the lever on displacement thereof, a motor controlled by the circuit means intermittently according to the difference between said forces, a constant speed motor, and differential means driven by said motors for adjusting the spring according to the difference between the speeds of the motors to equate the opposing force of the spring to the exerted force.

9. Measuring apparatus comprising a lever, a bellows connected directly to the lever and adapted to exert a force thereon according to the condition being measured, a rack, a pinion in mesh therewith, a spring for applying an opposing force to the bellows having opposite ends attached respectively to the rack and the lever, means for adjusting the force applied by the spring, including an intermittently operable motor, means actuated by the lever according to the difference between said forces for controlling the motor, a constant speed motor, and differential means driven by the motors for actuating the pinion to equate the opposing force of the spring to the exerted force.

10. Measuring apparatus comprising a lever, a bellows connected to the lever adapted to exert a force thereon according to the condition being measured, a rack, a pinion in mesh therewith, a spring for applying an opposing force to the bellows supported by the lever and rack, means for adjusting the tension of the spring and thereby the force applied by the spring to the lever which includes contact means intermittently operable by the lever according to the difference between said forces, circuit means including a motor operable by the contact means, a constant speed motor, and differential means driven by the motors for actuating the pinion to displace the rack and adjust the spring to equate the opposing force of the spring to the exerted force.

11. Measuring apparatus comprising a lever, a bellows connected to the lever adapted to exert a force thereon according to the condition being measured, a spring connected to the lever for applying an opposing force to the bellows, means for adjusting the force applied by the spring including an intermittently operable motor, means for controlling the speed of the motor by the lever according to the difference between said forces, a constant speed motor, differential means driven by said motors for adjusting the spring according to the difference between the speeds of the motors to equate the opposing force of the spring to the exerted force, and a variable speed mechanism jointly controlled by the motors for obtaining a measure of the rate of change of the condition being measured.

12. Measuring apparatus comprising a lever, a bellows connected directly to the lever and adapted to exert a force thereon according to the condition being measured, a spring connected to the lever for applying an opposing force to the bellows, a dithering device directly connected to the lever, means for adjusting the force applied by the spring including an intermittently operable motor, means for controlling the speed of the motor by the lever according to the difference between said forces, a constant speed motor, and differential means driven by said motor for adjusting the spring according to the difference between the speeds of the motors to equate the opposing force of the spring to the exerted force.

13. Measuring apparatus comprising a lever, a bellows connected directly to the lever and adapted to exert a force thereon according to the condition being measured, a spring connected to the lever for applying an opposing force to the bellows, means for adjusting the force applied by the spring including an intermittently operable motor, means for controlling the speed of the motor by the lever according to the difference between said forces, a constant speed motor, dither means actuated by the constant speed motor directly connected to the lever, and differential means driven by said motors for adjusting the spring according to the difference between the speeds of the motors to equate the opposing force of the spring to the exerted force.

14. Measuring apparatus comprising a lever, a bellows connected directly to the lever and adapted to exert a force thereon according to the condition being measured, a spring connected to the lever for applying an opposing force to the bellows, means for adjusting the force applied by the spring including an intermittently operable motor, means for controlling the speed of the motor by the lever according to the difference between said forces, a constant speed motor, dither means actuated thereby directly connected to the lever, differential means driven by said motors for adjusting the spring according to the difference between the speeds of the motors to equate the opposing force of the spring to the exerted force and a variable speed mechanism jointly controlled by the motors for obtaining a measure of the rate of change of the condition being measured.

15. Measuring apparatus comprising a lever, a bellows connected to the lever adapted to exert a force thereon according to the condition being measured, a spring connected to the lever for applying an opposing force to the bellows, a constant speed motor, dither means actuated thereby directly connected to the lever, means for adjusting the force applied by the spring to the lever including electric circuit means operable by the lever on displacement thereof, a motor operated by the circuit means intermittently according to the difference between said forces, and differential means driven by said motors for adjusting the spring according to the difference between the speeds of the motors to equate the opposing force of the spring to the exerted force.

16. Measuring apparatus comprising a lever, a bellows connected to the lever adapted to exert a force thereon according to the condition being measured, a spring connected to the lever for applying an opposing force to the bellows, a constant speed motor, dither means actuated thereby directly connected to the lever, means for adjusting the force applied by the spring to the lever including electric circuit means operable by the lever on displacement thereof, a motor operated by the circuit means intermittently according to the difference between said forces, differential means driven by said motors for adjusting the spring according to the difference between the speeds of the motors to equate the opposing force of the spring to the exerted force and a variable speed mechanism jointly controlled by the motors for obtaining a measure of the rate of change of the condition being measured.

17. Measuring apparatus comprising a lever, a bellows connected to the lever adapted to exert a force thereon according to the condition being measured, a rack, a pinion in mesh therewith, a spring for applying an opposing force to the bellows supported by the lever and rack, a constant speed motor, dither means actuated thereby directly connected to the lever, means for adjusting the tension of the spring and thereby the force applied by the spring to the lever which includes contact means variably and intermittently operated by the lever according to the difference between said forces, circuit means including a motor operated by the contact means, and differential means driven by the motors for actuating the pinion to displace the rack to equate the opposing force of the spring to the exerted force.

18. Measuring apparatus comprising a lever, a bellows connected to the lever adapted to exert a force thereon according to the condition being measured, a rack, a pinion in mesh therewith, a spring for applying an opposing force to the bellows supported by the lever and rack, a constant speed motor, dither means actuated thereby directly connected to the lever, means for adjusting the tension of the spring and thereby the force applied by the spring to the lever which includes contact means variably and intermittently operated by the lever according to the difference between said forces, circuit means including a motor operated by the contact means, differential means driven by the motors for actuating the pinion to displace the rack to equate the opposing force of the spring to the exerted force, and a variable speed mechanism jointly operated by the motors for obtaining a measure of the rate of change of the condition being measured.

EDWARD DAWSON.
JOHN ROWLAND ERICSON.

REFERENCES CITED

The following references are of record in the file of this patent:

UNITED STATES PATENTS

| Number | Name | Date |
| --- | --- | --- |
| 1,370,193 | Crocker | Mar. 1, 1921 |
| 1,487,402 | Roucka | Mar. 18, 1924 |
| 1,512,805 | Roucka | Oct. 21, 1924 |
| 1,585,170 | Roucka | May 18, 1926 |
| 1,633,713 | Roucka | June 28, 1927 |
| 1,638,100 | Roucka | Aug. 9, 1927 |
| 1,638,101 | Roucka | Aug. 9, 1927 |
| 1,641,196 | Roucka | Sept. 6, 1927 |
| 1,641,198 | Roucka | Sept. 6, 1927 |
| 1,681,309 | Paulin | Aug. 21, 1928 |
| 2,098,574 | Doyle | Nov. 9, 1937 |
| 2,107,976 | Blasig | Feb. 8, 1938 |
| 2,115,351 | Terry et al. | Apr. 26, 1938 |
| 2,151,941 | Rydberg | Mar. 28, 1939 |
| 2,185,578 | Beardsley et al. | Jan. 2, 1940 |
| 2,217,638 | Luhrs | Oct. 8, 1940 |
| 2,269,068 | Corbin | Jan. 6, 1942 |
| 2,337,152 | Clewell | Dec. 21, 1943 |
| 2,352,312 | Donaldson | June 27, 1944 |
| 2,383,758 | Ziebolz | Aug. 28, 1945 |

FOREIGN PATENTS

| Number | Country | Date |
| --- | --- | --- |
| 248,384 | Great Britain | May 25, 1927 |
| 681,544 | Germany | Sept. 25, 1939 |
| 708,653 | France | May 4, 1931 |